United States Patent [19]

Quam

[11] Patent Number: 5,312,150
[45] Date of Patent: May 17, 1994

[54] PICKUP TRUCK TAILGATE WITH STAIR

[76] Inventor: LeVerne Quam, Box 184, Sinai, S. Dak. 57061

[21] Appl. No.: 69,538

[22] Filed: Jun. 1, 1993

[51] Int. Cl.⁵ .............................................. B60R 3/02
[52] U.S. Cl. ...................................... 296/62; 296/57.1
[58] Field of Search ........................ 296/57.1, 61, 62

[56] References Cited

U.S. PATENT DOCUMENTS

| | | |
|---|---|---|
| 1,639,879 | 8/1927 | Buffington . |
| 2,721,345 | 10/1955 | Aken . |
| 2,991,118 | 7/1961 | Sleger . |
| 3,176,334 | 4/1965 | Lovdahl . |
| 3,392,990 | 7/1968 | Wolf . |
| 3,539,033 | 11/1970 | Schwarz et al. . |
| 3,610,658 | 10/1971 | Sartori . |
| 3,895,838 | 7/1975 | Hamada ........................ 296/57.1 |
| 3,900,118 | 8/1975 | Kellogg ........................ 296/57.1 X |
| 4,021,071 | 5/1977 | Norman . |
| 4,125,284 | 11/1978 | Hicks et al. . |
| 4,161,997 | 7/1979 | Norman . |
| 4,216,725 | 8/1980 | Hallam . |
| 4,275,664 | 6/1981 | Reddy . |
| 4,441,754 | 4/1984 | Hantel . |
| 4,444,429 | 4/1984 | Dawes . |
| 4,527,941 | 7/1985 | Archer . |
| 4,569,533 | 2/1986 | Gronert et al. . |
| 4,615,275 | 10/1986 | Ishizuka . |
| 4,757,876 | 7/1988 | Peacock ........................... 296/62 X |
| 4,846,487 | 7/1989 | Criley . |
| 4,848,821 | 7/1989 | Llewellyn . |
| 4,864,673 | 9/1989 | Adaway . |
| 5,133,584 | 7/1992 | McCleary ........................... 296/61 |

Primary Examiner—Joseph D. Pape
Attorney, Agent, or Firm—Faegre & Benson

[57] ABSTRACT

A tailgate for enclosing a pickup truck bed includes a sheet metal wall having upper and lower edges and opposite sides, and a stair with at least two steps integrally formed in the wall and extending between the opposite sides. Side walls are mounted on the opposite sides of the sheet metal wall. The lower edge of the tailgate includes a mount for mounting the tailgate to the pickup truck bed for pivotal motion between open and closed positions. A latch on the wall releasably secures the tailgate to the truck bed in the closed position. Flexible cables hold the tailgate in the open position with the steps horizontally orientated.

20 Claims, 1 Drawing Sheet

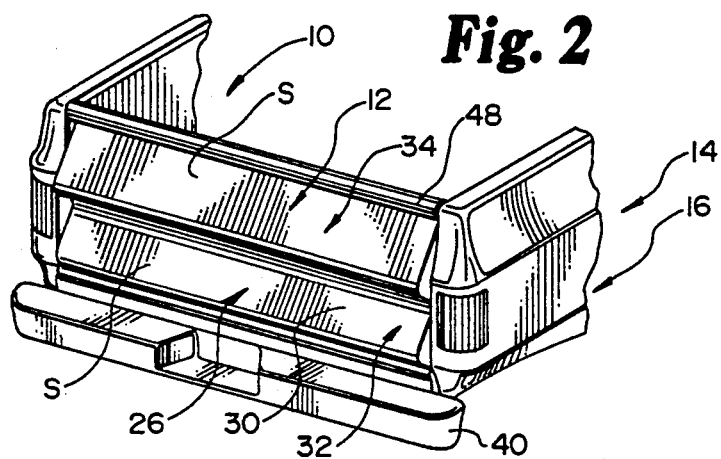
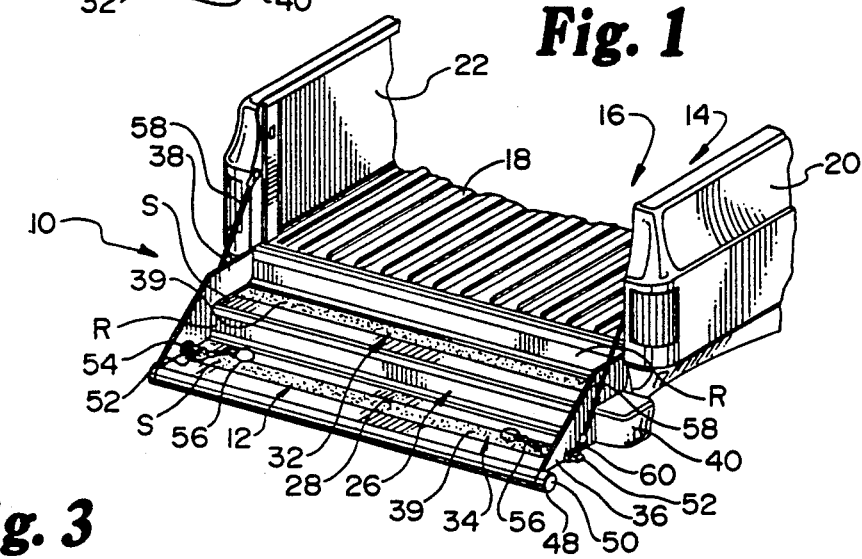
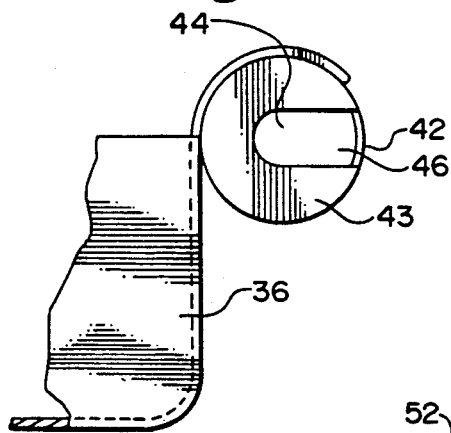
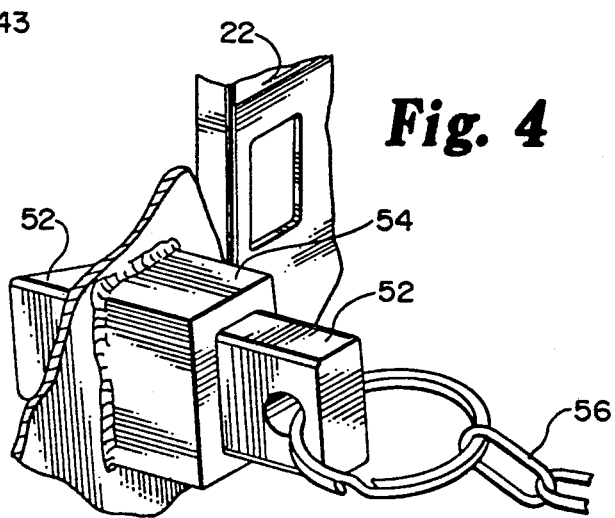

PICKUP TRUCK TAILGATE WITH STAIR

BACKGROUND OF THE INVENTION

The present invention relates generally to tailgates for vehicle beds. In particular, the present invention is a pickup truck tailgate with an integral stair.

The use of a step mounted on a pickup truck tailgate to assist people entering and exiting the truck bed is generally known. One such tailgate step is disclosed in the Sleger U.S. Pat. No. 2,991,118. This step is in the form of a V-shaped piece of sheet metal bolted to the tailgate of the vehicle. It is somewhat bulky, and will occupy space and possibly interfere with cargo carried within the truck bed.

The Dawes U.S. Pat. No. 4,444,429 discloses a recreational unit for vehicle beds. The tailgate of the unit includes a step. However, the step extends rearwardly from the vehicle when the tailgate is raised, and is therefore poorly suited for pickup trucks.

The Criley U.S. Pat. No. 4,846,487 discloses a foldable step which is mounted to the tailgate of a pickup truck. This step is relatively complicated in construction.

It is evident that there is a need for an improved tailgate step. The step which should occupy relatively little space within the truck bed. To be commercially viable it must also be rugged and efficient to manufacture.

SUMMARY OF THE INVENTION

The present invention is a rugged tailgate with a stair that occupies little, if any, more space within the vehicle bed than conventional tailgates. The tailgate is also capable of being efficiently manufactured. In one embodiment the tailgate includes a wall for enclosing the bed of the vehicle. The wall is mounted to the bed of the vehicle for pivotal motion between open and closed positions by a mount. A latch is used to secure the tailgate to the vehicle in the closed position. A stair including at least two steps extends between opposite sides of the wall.

In a preferred embodiment the stair is an integral unit formed as bends in the wall. When the tailgate is in the open position the stair includes an upper step above a bumper and below the bed of the vehicle, and a lower step below an upper edge of the vehicle bumper and behind the vehicle bumper. Flexible cables support the tailgate in the open position with the steps oriented horizontally.

BRIEF DESCRIPTION OF THE DRAWINGS

FIG. 1 is an illustration of the back of a pickup truck including a tailgate with stair in accordance with the present invention, with the tailgate shown in the open position.

FIG. 2 is an illustration of the pickup truck and tailgate shown in FIG. 1, with the tailgate in the closed position.

FIG. 3 is a detailed side view of one side of the lower edge of the tailgate, illustrating the pivot mount.

FIG. 4 is a detailed view of the latch shown in FIG. 2.

DETAILED DESCRIPTION OF THE PREFERRED EMBODIMENTS

A tailgate 10 with stair 12 in accordance with the present invention is illustrated on a pickup truck 14 in FIGS. 1 and 2. Tailgate 10 is pivotally mounted to the back of truck bed 16 which includes floor 18 and side walls 20 and 22. When in the closed position shown in FIG. 2, tailgate 10 functions in a conventional manner to enclose the back of truck bed 16. When in the open position shown in FIG. 1, stair 12 can be used to conveniently enter and exit truck bed 16.

Tailgate 10 includes a sheet metal wall 26 which forms both the inner surface 28 and outer surface 30 of the tailgate. Stair 12 is formed in wall 26 and is fabricated by bending the sheet metal which forms the wall. Stair 12 is therefore integral with wall 26.

In the embodiment shown, stair 12 includes two steps 32 and 34, each having a riser section R and a step section S extending between the opposite sides of tailgate 10. Riser sections R of steps 32 and 34 form right angles with the adjacent step sections S in the illustrated embodiment. Side walls 36 and 38 are welded to the opposite sides of stair 12 and are sized to extend upwardly from step sections S of the stair when tailgate 10 is in the open position shown in FIG. 1. Strips of friction enhancing material 39 can be applied to step sections S of steps 32 and 34 to help ensure proper footing by persons using stair 12.

When tailgate 10 is open, riser section R of upper step 32 extends downwardly from a position immediately behind truck bed floor 18. Step section S of upper step 32 extends rearwardly from riser section R of the upper step, to a position beyond the rearward end of truck bumper 40. Riser section R of lower step 34 extends downwardly from step section S of upper step 32 to a position below the upper edge of bumper 40. Step section S of lower step 34 extend rearwardly from riser section R of the lower step. This configuration positions upper step 32 above bumper 40 and below truck bed 18, and lower step 34 behind the bumper and between the upper edge of the bumper and the ground.

As shown in FIG. 3, a metal tube 42 is welded to the free end of riser section R of upper step 32. Tube 42 thereby forms the lower edge of tailgate 10. The free end of riser section R of upper step 32 is bent to fit around metal tube 42 at the location of the weld. Tailgate 10 is configured to be mounted to truck bed 14 in a conventional manner so it can be sold as an aftermarket unit for replacement of the original vehicle tailgate. Accordingly, plastic bushings 43 are secured within the opposite ends of tube 42 (only one is shown in FIG. 3), and include bores 44 sized to receive pivot pins (not shown) extending from the truck bed side walls 20 and 22 adjacent floor 18. A slot 46 extends through the sides of bushing 43 and tube 42 into communication with the bore 44 on one side of tailgate 10, to facilitate the mounting of the tailgate on pickup truck 14 in a conventional manner.

A metal tube 48 is welded to the free end of step section S of lower step 34, and forms the upper edge of tailgate 10. The free end of step section S of the lower step 34 is bent to fit around a portion of tube 48 at the location of the weld. Inserts 50 are secured within the opposite ends of tube 48. Tailgate 10 is configured in such a manner that tube 48 is at the same height as the upper edges of truck bed walls 20 and 22 when tailgate 10 is closed.

As shown in FIGS. 1 and 4, latch pins 52 are mounted within slide housings 54 on each side wall 36 and 38 of tailgate 10. The latch pins 52 extend through apertures in side walls 36 and 38, and are biased outwardly from the side walls by springs (not visible) within housings 54. Tailgate 10 is latched in its closed position (FIG. 2) by pins 52 which extend into apertures or recesses conventionally found in truck bed side walls 20 and 22. Chains 56 are simultaneously pulled to remove pins 52 from the apertures against the bias force of the springs when it is desired to open tailgate 10. Tapered edges on the ends of pins 52 facing truck bed 18 engage truck bed side walls 20 and 22 and urge the pins inwardly when tailgate 10 is forced into its closed position. Chains 56 therefore need not be pulled while closing tailgate 10. Flexible cables 58 extending between truck bed sidewalls 20 and 22 and lugs 60 on the sidewalls 36 and 38 of tailgate 10 support the tailgate in its open position. Cables 58 are sized so step sections S of stair 12 are at a level orientation when tailgate 10 is open.

Tailgates with stairs in accordance with the present invention have considerable advantages over those of the prior art. The stair occupies little, if any, more space than conventional tailgates. It therefore does not reduce the amount of cargo space available in the truck bed. Since it has no moving or foldable components, the stair will be relatively maintenance free. The stair also adds strength to the wall of the tailgate. Furthermore, the tailgate can be efficiently fabricated.

Although the present invention had been described with reference to preferred embodiments, those skilled in the art will recognize that changes may be made in form and detail without departing from the spirit and scope of the invention.

What is claimed is:

1. A pickup truck tailgate, including:
 a sheet material wall having first and second opposite surfaces, upper and lower edges and opposite sides, wherein the first surface functions as a truck bed rear wall surface and the second surface functions as an exterior tailgate surface;
 a mount on the lower edge of the sheet material wall for mounting the tailgate to the bed of the vehicle for pivotal motion between open and closed positions;
 a latch for latching the tailgate to the bed of the vehicle when the tailgate is in the closed position; and
 a stair including at least two steps in the sheet material wall extending between the opposite sides of the wall.

2. The tailgate of claim 1 wherein the stair is formed as bends in the sheet material wall.

3. The tailgate of claim 1 wherein:
 the tailgate further includes a tube extending across the lower edge of the wall; and
 the mount includes pivot blushing in the ends of the tube.

4. The tailgate of claim 1 and further including a tube extending across the upper edge of the wall.

5. The tailgate in claim 1 wherein the stair includes an upper step above a bumper and below the bed of the vehicle when the tailgate is in the open position.

6. The tailgate of claim 5 wherein the stair includes a lower step below an upper edge of the vehicle bumper and behind the vehicle bumper when the tailgate is in the open position.

7. The tailgate of claim 1 wherein the stair includes two steps.

8. The tailgate of claim 1 and further including a latch for releasably latching the tailgate to the vehicle bed in the closed position.

9. The tailgate of claim 1 and further including a support for supporting the tailgate in the open position with the steps oriented horizontally.

10. The tailgate of claim 1 and further including friction enhancing material on the stair.

11. The tailgate of claim 1 and further including side walls on the opposite sides of the sheet material wall.

12. A tailgate for enclosing a pickup truck bed, including:
 a sheet metal wall having first and second opposite surfaces, upper and lower edges and opposite sides, wherein the first surface functions as a truck bed rear wall surface, and the second surface functions as an exterior tailgate surface;
 a stair including at least two steps integrally formed in the sheet metal wall and extending between the opposite sides;
 a mount on the lower edge of the sheet metal wall for mounting the tailgate to the pickup truck bed for pivotal motion between open and closed positions;
 a latch on the wall for releasably latching the tailgate to the pickup truck bed in the closed position; and
 a support for holding the tailgate in the open position with the steps horizontally oriented.

13. The tailgate of claim 12 wherein the stair includes only upper and lower steps, the upper step positioned above a bumper of the pickup and below the bed when the tailgate is in the open position, and the lower step positioned below an upper edge of the bumper and behind the bumper when the tailgate is in the open position.

14. The tailgate of claim 12 wherein:
 the tailgate further includes a tube mounted to the lower edge of the sheet metal wall; and
 the mount include a mechanism for pivotally mounting ends of the tube to the pickup truck.

15. The tailgate of claim 12 wherein the latch includes spring-biased pins for engaging the pickup truck bed.

16. The tailgate of claim 12 and further including friction enhancing material on the stair.

17. The tailgate of claim 12 and further including side walls on the sheet metal wall.

18. A pickup truck having a bed and a tailgate for enclosing the bed, the tailgate including:
 a sheet material wall having first and second opposite surfaces, upper and lower edges and opposite sides, wherein the first surface functions as a truck bed rear wall surface, and the second surface functions as an exterior tailgate surface;
 a stair including at least two steps in the sheet material wall and extending between the opposite sides;
 a mount on he lower edge of the sheet material wall for mounting the tailgate to the pickup truck bed for pivotal motion between open and closed positions;
 a latch on the sheet material wall for releasably latching the tailgate to the pickup truck bed in the closed position;
 a support for holding the tailgate in the open position with the steps horizontally oriented.

19. The pickup truck of claim 18 wherein:
 the pickup truck further includes a rear bumper; and
 a stair in the tailgate includes only upper and lower steps, the upper step positioned above a bumper of the pickup truck and below the bed when the tailgate is in the open position, and the lower step positioned below an upper edge of the bumper and behind the bumper when the tailgate is in the open position.

20. The pickup truck of claim 19 wherein the tailgate further includes sidewalls on the opposite sides of the sheet material wall.

* * * * *

UNITED STATES PATENT AND TRADEMARK OFFICE
CERTIFICATE OF CORRECTION

PATENT NO. : 5,312,150

DATED : May 17, 1994

INVENTOR(S) : LeVerne Quam

It is certified that error appears in the above-identified patent and that said Letters Patent is hereby corrected as shown below:

Column 3,

Claim 3, line 4, delete "blushing" and insert --bushings--

Column 4,

Claim 18, line 10, delete "he" and insert --the--

Signed and Sealed this

Sixteenth Day of August, 1994

Attest:

BRUCE LEHMAN

Attesting Officer

Commissioner of Patents and Trademarks